United States Patent [19]

Kuriyama et al.

[11] Patent Number: 5,744,115
[45] Date of Patent: Apr. 28, 1998

[54] PREPARATION PROCESS OF HYDRAZINE HYDRATE

[75] Inventors: Yasuhisa Kuriyama; Nobuhiro Nagata; Kiyoshi Yoshida, all of Yokkaichi, Japan

[73] Assignee: Mitsubishi Gas Chemical Company, Inc., Tokyo, Japan

[21] Appl. No.: 684,402

[22] Filed: Jul. 19, 1996

[30] Foreign Application Priority Data

Aug. 14, 1995 [JP] Japan ............................ 7-207071

[51] Int. Cl.$^6$ .................................................... C01B 21/16
[52] U.S. Cl. .................................................... 423/407
[58] Field of Search ......................................... 423/407

[56] References Cited

U.S. PATENT DOCUMENTS 4,725,421  2/1988  Schirmann et al. ............... 423/407

FOREIGN PATENT DOCUMENTS 189185   10/1984  Japan ............................ 423/407
1 488 967  10/1977  United Kingdom .

OTHER PUBLICATIONS

Database WPI, Section Ch, Week 8449, Derwent Publications Ltd., London GB; Class A97, AN 84-303768 XP002020370 of JP-A-59 189 185, 26 Oct. 1984.

Hiromu Hayashi, "Ammonia-Hydrazine Conversion Processes", 1988, vol. 41, pp. 213–224, Applied Catalysis, Amsterdam.

Database WPI, Section Ch, Week 8151, Derwent Publications Ltd., London, GB; Class E35, AN 81-94358D XP002020371 of SU-A-812 711, 15 Mar. 1981.

"Kirk–Othmer", Encyclopedia Of Chemical Technology, 3rd Edition, vol. 12, 1980, pp. 734–755.

*Primary Examiner*—Wayne Langel
*Attorney, Agent, or Firm*—Frishauf, Holtz, Goodman, Langer & Chick, P.C.

[57] ABSTRACT

A preparation process of hydrazine hydrate is herein disclosed which comprises the step of hydrolyzing a ketazine in a distillation column to obtain hydrazine hydrate, a nonionic surface active agent having a polyoxyethylene group in its molecule and/or silicon dioxide being present in the distillation column.

According to this process, in the hydrolytic distillation of the ketazine, flooding can be inhibited and thus a stable operation can be accomplished. As a result, hydrazine hydrate can economically advantageously be prepared.

19 Claims, No Drawings

PREPARATION PROCESS OF HYDRAZINE HYDRATE

BACKGROUND OF THE INVENTION

1. Field of the Invention

The present invention relates to a process for industrially preparing hydrazine hydrate from a ketazine.

2. Description of the Related Arts

As a preparation process of hydrazine hydrate, there has been a process which comprises hydrolyzing a ketazine obtainable by various methods. Here, the ketazine can be synthesized by oxidizing ammonia with an oxidizing agent such as sodium hypochlorite or hydrogen peroxide in the presence of a ketone.

The hydrolysis can usually be carried out by continuously feeding the ketazine and water in a certain ratio to a distillation column, and then doing a hydrolytic reaction under applied pressure to obtain ketone as a distillate and an aqueous hydrazine hydrate solution as bottoms.

In the distillation column where the ketazine is hydrolyzed, flooding is liable to occur, and if a sufficient column diameter and sufficient step spaces are not provided, its operation easily becomes impossible. However, for the installation of the distillation column in which the flooding can be completely prevented, expenses increase, which is not economical.

SUMMARY OF THE INVENTION

The present invention has been developed to solve the above-mentioned problems, and an object of the present invention is to provide a preparation process of hydrazine hydrate which permits the stable operation of a distillation column for hydrolyzing a ketazine and which is industrially simple and economically advantageous.

The present inventors have intensively investigated to solve the above-mentioned problems, and as a result, it has been found that when distillation is carried out in the presence of a certain kind of surface active agent or the like in the distillation column, the hydrolysis of the ketazine stably proceeds. The present invention has been completed on the basis of this found knowledge.

That is to say, the present invention is directed to a preparation process of hydrazine hydrate which comprises the step of hydrolyzing a ketazine in a distillation column to obtain hydrazine hydrate, at least one of a nonionic surface active agent having a polyoxyethylene group in its molecule and silicon dioxide (hereinafter referred to as "the surface active agent or the like") being present in the distillation column.

DESCRIPTION OF THE PREFERRED EMBODIMENTS

In the present invention, various kinds of ketazines can be used, and no particular restriction is put on the kind of ketazine, so far as it can produce hydrazine hydrate. In general, examples of the ketazine include compounds represented by the formula $R_1R_2C=N-CR_1R_2$ wherein $R_1$ and $R_2$ are each an alkyl group having 1 to 12 carbon atoms, a branched alkyl group or a cycloalkyl group having 3 or 12 carbon atoms, an aromatic group having 6 or 12 carbon atoms, or a straight-chain or a branched alkylene group having 3 or 12 carbon atoms; these groups may be substituted by a halogen atom, an $NO_2$ group, a hydroxyl group, an alkoxy group or a carboxylic acid ester; and $R_1$ and $R_2$ may be the same or different.

The ketazine can be prepared by oxidizing ammonia with an oxidizing agent such as sodium hypochlorite or hydrogen peroxide in the presence of a ketone represented by the formula $R_1R_2C=O$. For the preparation of the hydrazine from the ketazine, it is particularly preferable that acetone, methyl ethyl ketone or methyl isobutyl ketone is used as a material for the preparation of the ketazine. This ketazine may contain a by-product of a ketazine synthetic reaction such as a hydrazone represented by the formula $R_1R_2C=N-NH_2$.

The hydrolysis in the present invention proceeds by distilling the ketazine together with water in a distillation column. At this time, the conditions of the distillation depend upon the kind of ketazine and the structure of the distillation column, and so they cannot uniformly be decided. Preferably, the hydrolysis is carried out by feeding the ketazine and water in a ratio of 1:2 to 1:20 to the middle portion of a packed column or a plate column having a column bottom temperature maintained at 100° to 200° C. under a pressure of 1 to 20 atm to obtain ketone as a distillate and an aqueous hydrazine hydrate solution as bottoms.

A surface active agent which can be used in the present invention is a nonionic surface active agent having a polyoxyethylene group represented by the formula $(CH_2CH_2O)_n$ (wherein n is an integer of 2 or more) as a hydrophilic group in its molecule. The value of n is not necessarily a constant value, and so the surface active agent may be a mixture of compounds having various values of n, in other words, compounds in a molecular distribution. Preferable examples of a hydrophobic group in the molecule of the nonionic surface active agent include straight-chain and branched alkyl groups each having 3 or more carbon atoms, cycloalkyl groups, aromatic groups, and straight-chain and branched alkylene groups.

Typical examples of the nonionic surface active agent having the hydrophilic group and the hydrophobic group include compounds such as esters of polyethylene glycol, ethers of polyethylene glycol, alkylamines of polyethylene glycol and polyoxyethylene-polyoxypropylene block copolymers.

Examples of the preferably usable esters of polyethylene glycol include monoesters and diesters of lauric acid, myristic acid, palmitic acid, stearic acid, 12-hydroxystearic acid, 9,10-dihydroxystearic acid, phenylstearic acid, o-xylylstearic acid, p-hydroxyphenylstearic acid and oleic acid. Above all, palmitic acid monoester, palmitic acid diester, stearic acid monoester, stearic acid diester, oleic acid monoester and oleic acid diester of polyethylene glycol are more preferable.

Examples of the ethers of polyethylene glycol include compounds produced by the ether linkage of the polyoxyethylene group and a hexyl group, a 2-butylhexyl group, a heptyl group, an octyl group, a nonyl group, a decyl group, a lauryl group, a tridecyl group, a cetyl group, a stearyl group, an oleyl group, an octylphenyl group, an isooctylphenyl group, a nonylphenyl group, an octylcresyl group and a benzylcresyl group. Additional examples of these ethers include compounds produced by the ether linkage of the polyethylene glycol and esters of sorbitan and lauric acid, myristic acid, stearic acid and oleic acid. Above all, lauryl ether and stearyl ether of polyethylene glycol, and monostearyl ether of sorbitan are more preferable.

Examples of the alkylamines of polyethylene glycol include dipolyethylene glycol dodecylamine, dipolyethylene glycol octadecylamine, tetrapolyethylene glycol ethylenediamine and tetrapolyethylene glycol propylenediamine.

Examples of the polyoxyethylene-polyoxypropylene block copolymers include compounds represented by the formulae

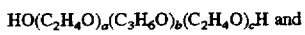

HO(C₂H₄O)ₐ(C₃H₆O)ᵦ(C₂H₄O)ᵧH and

HO(C₃H₆O)ₐ(C₂H₄O)ᵦ(C₃H₆O)ᵧH, and above all, there can be preferably used compounds in which an average molecular weight is in the range of 1000 to 20000 and the content of the polyoxyethylene group in the molecule is in the range of 5 to 90% by weight. In addition, compounds bonded to an alkylamine represented by the formula

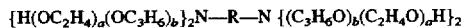

{H(OC₂H₄)ₐ(OC₃H₆)ᵦ}₂N—R—N{(C₃H₆O)ᵦ(C₂H₄O)ₐH}₂ are also usable, and above all, there can be preferably used the compounds in which an average molecular weight is in the range of 1000 to 10000 and the content of a polyoxyethylene group in the molecule is in the range of 10 to 70% by weight.

These nonionic surface active agents can be used singly or in a combination of two or more thereof.

No particular restriction is put on the state of silicon dioxide which can be used in the present invention, and an amorphous state, a glass state or a colloidal state is acceptable.

In the present invention, either or both of the nonionic surface active agent and silicon dioxide can be used.

No particular restriction is put on a technique of adding the surface active agent or the like to the hydrolytic distillation column. For example, the surface active agent or the like may be previously dissolved or dispersed in the ketazine and the resulting mixture may be then fed to the distillation column, or they may be directly fed to the distillation column or may be dissolved or dispersed in water or a mineral oil and then fed thereto. The amount of the surface active agent or the like to be added depends upon the kind of surface active agent or the like, but it is preferably in the range of 0.1 to 10000 ppm based on the weight of the ketazine in the distillation column.

Furthermore, the present inventors have found that by adding the surface active agent or the like to a position of the distillation column where a solution having a hydrazone concentration of 1% by weight or more is present, the distillation column can be extremely stably driven. In a preferable operation state of the hydrolytic distillation column, a section for the hydrolytic reaction of the ketazine to a hydrazone is in the vicinity of a ketazine feed position, and on the downstream side of the hydrolysis section, there is a section for the disproportionation reaction of the hydrazone to hydrazine hydrate and a ketone. Hydrazine hydrate is further forwarded to the bottom of the distillation column, and the ketone is delivered to the top of the distillation column, whereby hydrazine hydrate and the ketone are separated from each other. Therefore, from the viewpoint of efficiency, it is particularly preferable that the surface active agent or the like is fed to the column through a suitable position between the feed position of the ketazine and the bottom of the column.

The surface active agent or the like added to the distillation column is drawn out together with the aqueous hydrazine hydrate solution through the bottom of the column. The drawn surface active agent or the like can easily be removed from the aqueous hydrazine hydrate solution by distillation or a liquid-liquid separation technique. Incidentally, the above-mentioned surface active agent or the like does not have any bad influence on the quality of hydrazine hydrate.

According to the present invention, the hydrolytic distillation of the ketazine can stably be carried out to economically prepare hydrazine hydrate.

Next, the present invention will be described with reference to examples, but the scope of the present invention should not be limited to these examples.

COMPARATIVE EXAMPLE 1

Methyl ethyl ketazine and water were fed at feed rates of 9.8 kg/hr and 12.6 kg/hr, respectively, to the 13th tray from the top of a bubble cap column (inner diameter=240 mm, height=15000 mm, 45 trays), and distillation was then started at a column bottom temperature of 180° C. and a column top temperature of 140° C. under a column bottom pressure of 8 atm in a reflux ratio of 10 so that methyl ethyl ketone and water might be obtained as a distillate and a 40% by weight aqueous hydrazine hydrate solution might be obtained as bottoms. During the operation of the distillation, flooding occurred between the 20th tray from the top and the bottom of the column, so that the system eventually became such a state that the desired distillate and bottoms could not be obtained.

EXAMPLE 1

The hydrolytic distillation of a ketazine was carried out in the same manner as in Comparative Example 1 except that stearic acid monoester of polyethylene glycol was fed at a feed rate of 0.1 g/hr to the 40th tray from the top of a distillation column. The fluctuation of the pressure and temperature in the column was scarcely observed, and a stable operation could be continued.

EXAMPLE 2

The hydrolytic distillation of a ketazine was carried out in the same manner as in Comparative Example 1 except that oleic acid monoester of polyethylene glycol was added at a rate of 10 g/hr to the ketazine prior to feeding to a distillation column. The fluctuation of the pressure and temperature in the column was scarcely observed, and a stable operation could be continued.

EXAMPLE 3

The hydrolytic distillation of a ketazine was carried out in the same manner as in Comparative Example 1 except that lauryl monoether of polyethylene glycol was fed at a feed rate of 5 g/hr to the 30th tray from the top of a distillation column. The fluctuation of the pressure and temperature in the column was scarcely observed, and a stable operation could be continued.

EXAMPLE 4

The hydrolytic distillation of a ketazine was carried out in the same manner as in Comparative Example 1 except that a polyoxyethylene-polyoxypropylene copolymer having an average molecular weight of 2000 and a polyoxyethylene group content of 10% by weight in the molecule was fed at a feed rate of 5 g/hr to the 30th tray from the top of a distillation column. The fluctuation of the pressure and temperature in the column was scarcely observed, and a stable operation could be continued.

EXAMPLE 5

The hydrolytic distillation of a ketazine was carried out in the same manner as in Comparative Example 1 except that a polyoxyethylene-polyoxypropylene copolymer having an average molecular weight of 4200 and a polyoxyethylene group content of 40% by weight in the molecule was fed at a feed rate of 5 g/hr to the 40th tray from the top of a distillation column. The fluctuation of the pressure and temperature in the column was scarcely observed, and a stable operation could be continued.

EXAMPLE 6

The hydrolytic distillation of a ketazine was carried out in the same manner as in Comparative Example 1 except that a solution comprising 90% by weight of water and 10% by weight of a polyoxyethylene-polyoxypropylene copolymer having an average molecular weight of 16000 and a polyoxyethylene group content of 80% by weight in the molecule was fed at a feed rate of 50 g/hr to the 30th tray from the top of a distillation column. The fluctuation of the pressure and temperature in the column was scarcely observed, and a stable operation could be continued.

EXAMPLE 7

The hydrolytic distillation of a ketazine was carried out in the same manner as in Comparative Example 1 except that a tetra(polyoxyethylene-polyoxypropylene copolymer) having an average molecular weight of 4600 and a polyoxyethylene group content of 40% by weight in the molecule was fed at a feed rate of 5 g/hr to the 30th tray from the top of a distillation column. The fluctuation of the pressure and temperature in the column was scarcely observed, and a stable operation could be continued.

EXAMPLE 8

The hydrolytic distillation of a ketazine was carried out in the same manner as in Comparative Example 1 except that a solution comprising 10% by weight of silicon dioxide and 90% by weight of a mineral oil was added at a rate of 10 g/hr to the ketazine prior to feeding to a distillation column. The fluctuation of the pressure and temperature in the column was scarcely observed, and a stable operation could be continued.

EXAMPLE 9

The hydrolytic distillation of a ketazine was carried out in the same manner as in Comparative Example 1 except that a solution comprising 30% by weight of a fatty acid ester of polyethylene glycol (a mixture of a palmitate, a stearate and an oleate; average molecular weight=300), 2% by weight of silicon dioxide and 68% by weight of a mineral oil (paraffinic, viscosity=150 cP at 25° C.) was fed at a feed rate of 1 g/hr to the 30th tray from the top of a distillation column. The fluctuation of the pressure and temperature in the column was scarcely observed, and a stable operation could be continued.

COMPARATIVE EXAMPLE 2

The hydrolytic distillation of a ketazine was carried out in the same manner as in Comparative Example 1 except that a polyethylene glycol having an average molecular weight of 600 was fed at a feed rate of 10 g/hr to the 30th tray from the top of a distillation column. During the operation of the distillation, flooding occurred between the 20th tray from the top and the bottom of the column, so that the system eventually became such a state that the desired distillate and bottoms could not be obtained.

COMPARATIVE EXAMPLE 3

The hydrolytic distillation of a ketazine was carried out in the same manner as in Comparative Example 1 except that isoamyl stearate was fed at a feed rate of 10 g/hr to the 30th tray from the top of a distillation column. During the operation of the distillation, flooding occurred between the 20th tray from the top and the bottom of the column, so that the system eventually became such a state that the desired distillate and bottoms could not be obtained.

COMPARATIVE EXAMPLE 4

The hydrolytic distillation of a ketazine was carried out in the same manner as in Comparative Example 1 except that a mineral oil (paraffinic, viscosity=150 cP at 25° C.) was fed at a feed rate of 10 g/hr to the 30th tray from the top of a distillation column. During the operation of the distillation, flooding occurred between the 20th tray from the top and the bottom of the column, so that the system eventually became such a state that the desired distillate and bottoms could not be obtained.

What is claimed is:

1. A process for preparing hydrazine hydrate which comprises hydrolyzing a ketazine in a distillation column in the presence of at least one member selected from the group consisting of (i) a nonionic surface active agent having a polyoxyethylene group in its molecule and (ii) silicon dioxide, to obtain said hydrazine hydrate.

2. The process for preparing hydrazine hydrate according to claim 1, wherein the process is carried out in the presence of said nonionic surface active agent which is selected from the group consisting of polyoxyethylene fatty acid esters, polyoxyethylene alkyl ethers, polyoxyethylenealkylamines and polyoxyethylene-polyoxypropylene block copolymers.

3. The process for preparing hydrazine hydrate according to claim 1, wherein said at least one member selected from the group consisting of the nonionic surface active agent and silicon dioxide is fed to the distillation column at a position between a position wherein the ketazine is fed and the bottom of the distillation column.

4. The process for preparing hydrazine hydrate according to claim 1, wherein the amount of said at least one member selected from the group consisting of the nonionic surface active agent and silicon dioxide is 0.1 to 10000 ppm based on the weight of the ketazine in the distillation column.

5. The process of preparing hydrazine hydrate according to claim 4, wherein the ketazine is of the formula $R_1R_2C=N-N=CR_1R_2$, wherein $R_1$ and $R_2$ are the same or different and each is a $C_1-C_{12}$ alkyl group, a $C_3-C_{12}$ branched alkyl group or cycloalkyl group, a $C_6-C_{12}$ aromatic group, or a $C_3-C_{12}$ straight-chain or branched alkylene group, wherein said groups are unsubstituted or substituted by a halogen atom, an $NO_2$ group, a hydroxyl group, an alkoxy group or a carboxylic acid ester.

6. The process of preparing hydrazine hydrate according to claim 5, wherein the ketazine is fed into the distillation column with water in a ratio of 1:2 to 1:20.

7. The process of preparing hydrazine hydrate according to claim 6, wherein the hydrolyzing is carried out at a temperature of 100° to 200° C.

8. The process of preparing hydrazine hydrate according to claim 7, wherein the hydrolyzing is carried out at a pressure of 1 to 20 atm.

9. The process of preparing hydrazine hydrate according to claim 1, wherein the process is carried out in the presence of said silicon dioxide.

10. The process of preparing hydrazine hydrate according to claim 1, wherein the process is carried out in the presence of both (i) said nonionic surface agent having a polyoxyethylene group in its molecule and (ii) said silicon dioxide.

11. The process of preparing hydrazine hydrate according to claim 2, wherein the process is carried out in the presence of said nonionic surface active agent which is an ester of polyethylene glycol and which is a monoester or diester of an acid selected from the group consisting of lauric acid, myristic acid, palmitic acid, stearic acid, 12-hydroxystearic acid, 9,10-dihydroxystearic acid, phenyl-stearic acid, o-xylylstearic acid, p-hydroxyphenylstearic acid and oleic acid.

12. The process of preparing hydrazine hydrate according to claim 2, wherein the process is carried out in the presence of said nonionic surface active agent which is an ether of polyethylene glycol produced by the ether linkage of a polyoxyethylene group and a hexyl group, a 2-butylhexyl group, a heptyl group, an octyl group, a nonyl group, a decyl group, a lauryl group, a tridecyl group, a cetyl group, a stearyl group, an oleyl group, an octylphenyl group, an isooctylphenyl group, a nonylphenyl group, an octylcresyl group or a benzylcresyl group.

13. The process of preparing hydrazine hydrate according to claim 2, wherein the process is carried out in the presence of said non-ionic surface active agent which is an alkylamine of polyethylene glycol selected from the group consisting of dipolyethylene glycol dodecylamine, dipolyethylene glycol octadecylamine, tetrapolyethylene glycol ethylenediamine and tetrapolyethylene glycol propylenediamine.

14. The process of preparing hydrazine hydrate according to claim 2, wherein the process is carried out in the presence of said non-ionic surface active agent which is a polyoxyethylene-polyoxypropylene block copolymer having an average molecular weight of 100 to 20000 and having a content of a polyoxyethylene group in the molecule of 5 to 90% by weight.

15. The process of preparing hydrazine hydrate according to claim 4, wherein the ketazine is methyl ethyl ketazine.

16. The process of preparing hydrazine hydrate according to claim 14, wherein the nonionic surface active agent is the stearic acid monoester of polyethylene glycol.

17. The process of preparing hydrazine hydrate according to claim 14, wherein the nonionic surface active agent is the oleic acid monoester of polyethylene glycol.

18. The process of preparing hydrazine hydrate according to claim 14, wherein the nonionic surface active agent is the lauryl monoester of polyethylene glycol.

19. The process of preparing hydrazine hydrate according to claim 1, wherein the process is carried out in the presence of said nonionic surface active agent which is introduced into the distillation column at a position where a solution having a hydrazone concentration of 1% by weight or more is present.

* * * * *